US012809738B2

(12) United States Patent
Krasner et al.

(10) Patent No.: US 12,809,738 B2
(45) Date of Patent: Nov. 24, 2026

(54) DYNAMIC AND PERSISTENT MEMORY RESIZING IN STORAGE ARRAYS BASED ON TEMPORAL WORKLOAD CHARACTERISTICS

(71) Applicant: Dell Products L.P., Round Rock, TX (US)

(72) Inventors: Jonathan I. Krasner, Coventry, RI (US); Ramesh Doddaiah, Westborough, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 559 days.

(21) Appl. No.: 18/464,891

(22) Filed: Sep. 11, 2023

(65) Prior Publication Data

US 2025/0086085 A1 Mar. 13, 2025

(51) Int. Cl.

| | |
|---|---|
| ***G06F 11/34*** | (2006.01) |
| ***G06F 9/50*** | (2006.01) |
| ***G06T 1/60*** | (2006.01) |

(52) U.S. Cl.

CPC ........ *G06F 11/3409* (2013.01); *G06F 9/5016* (2013.01); *G06F 9/5033* (2013.01); *G06F 11/3466* (2013.01); *G06F 9/5027* (2013.01); *G06F 2209/5011* (2013.01); *G06F 2209/5019* (2013.01); *G06F 2209/508* (2013.01); *G06T 1/60* (2013.01)

(58) Field of Classification Search

CPC .. G06F 11/3409; G06F 9/5016; G06F 9/5033; G06F 11/3466; G06F 2209/5011; G06F 2209/5019; G06F 2209/508; G06F 9/5027; G06T 1/60

See application file for complete search history.

(56) References Cited

U.S. PATENT DOCUMENTS

2020/0125412 A1 * 4/2020 Singh ...................... G06F 3/061

OTHER PUBLICATIONS

Ruan et al. (Workload time series prediction in storage systems: a deep learning based approach. Cluster Comput 26, 25-35. Jan. 13, 2021. https://doi.org/10.1007/s10586-020-03214-y) (Year: 2021).*

(Continued)

*Primary Examiner* — Christian T Bryant

(74) *Attorney, Agent, or Firm* — Amin, Turocy & Watson, LLP

(57) ABSTRACT

A system can maintain a memory pool that comprises a first tier of memory and a second tier of memory. The system can perform a group of operations at least one time, comprising: determining an autoregressive integrated moving average of first time series metrics of past accesses of the memory pool to produce second time series metrics of forecast accesses, wherein the second time series metrics are provided as input to a reinforcement learning model, wherein an output of the reinforcement learning model comprises feedback to adjust a size of mirrored and non-mirrored portions of the first tier, wherein the output comprises feedback to adjust a weight of forecasting results associated with the second time series metrics, and determining to halt performing the operations where the size satisfies a defined criterion. The system can adjust a size of the second tier of memory based on the first tier.

20 Claims, 13 Drawing Sheets

(56) References Cited

OTHER PUBLICATIONS

Bi et al. ("ARIMA-Based and Multiapplication Workload Prediction With Wavelet Decomposition and Savitzky-Golay Filter in Clouds,"in IEEE Transactions on Systems, Man, and Cybernetics: Systems, vol. 54, No. 4, pp. 2495-2506, Apr. 2024, doi: 10.1109/TSMC.2023.3343925.) (Year: 2024).*

Taghavi et al. (Compute Job Memory Recommender System Using Machine Learning. In Proceedings of the 22nd ACM SIGKDD International Conference on Knowledge Discovery and Data Mining (KDD '16), 609-616. Aug. 13, 2016. https://doi.org/10.1145/2939672 (Year: 2016).*

* cited by examiner

DYNAMIC AND PERSISTENT MEMORY RESIZING IN STORAGE ARRAYS BASED ON TEMPORAL WORKLOAD CHARACTERISTICS

BACKGROUND

Computer systems can store computer data. An example of such a computer system can be a storage array, which can comprise multiple storage devices, such as solid state drives (SSDs) and hard disk drives (HDDs).

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a memory pool that comprises a first tier of memory and a second tier of memory, wherein the first tier of memory is associated with a speed metric that is superior to the second tier of memory. The system can perform a group of operations at least one time, the group of operations comprising, for a current time of the at least one time: determining an autoregressive integrated moving average of first time series metrics of past accesses of the memory pool to produce second time series metrics of forecast future accesses of the memory pool, wherein the second time series metrics are provided as input to a reinforcement learning model, wherein a first output of the reinforcement learning model comprises first feedback to adjust a first size of a mirrored write segment portion of the first tier of memory and a second size of a non-mirrored read segment portion of the first tier of memory, wherein an overall size of the first tier of memory remains constant, wherein a second output of the reinforcement learning model comprises second feedback to adjust a weight of forecasting results associated with the second time series metrics of forecast future accesses of the memory pool in a subsequent time of the at least one time subsequent to the current time at which the group of operations is being performed, and determining to halt the performing of the group of operations at least one time where the first size and the second size satisfy a defined criterion. The system can, after the performing of the group of operations at least one time, adjust a third size of the second tier of memory based on the first size and the second size, and store computer data in the memory pool.

An example method can comprise performing, by a system comprising a processor, respective iterations of determining an autoregressive integrated moving average and producing an output of a reinforcement learning model, wherein the respective iterations comprise: determining the autoregressive integrated moving average of first time series metrics of past performance of a memory pool to produce second time series metrics of forecast future performance of the memory pool, wherein the memory pool comprises a first tier of memory and a second tier of memory, providing the second time series metrics as input to the reinforcement learning model, and producing the output of the reinforcement learning model that comprises first feedback to adjust respective sizes of a mirrored portion of the first tier of memory and a non-mirrored portion of the first tier of memory, and second feedback to adjust a weight of forecasting results associated with the second time series metrics of forecast future performance of the memory pool in a subsequent iteration. The method can further comprise halting, by the system, the performing of the respective iterations where the respective sizes of the mirrored portion and the non-mirrored portion satisfy a defined criterion. The method can further comprise, after the performing of the respective iterations, storing, by the system, specified computer data in the memory pool.

An example non-transitory computer-readable medium can comprise instructions that, in response to execution, cause a system comprising a processor to perform operations. These operations can comprise performing iterations of determining an autoregressive integrated moving average and producing an output of a reinforcement learning model until an optimality criterion of the memory pool is satisfied, comprising, determining the autoregressive integrated moving average of first time series metrics of the memory pool to produce second time series metrics of the memory pool, inputting the second time series metrics to the reinforcement learning model, and producing the output of the reinforcement learning model that comprises first feedback to adjust respective sizes of a mirrored portion and a non-mirrored portion of a tier of the memory pool, and second feedback to adjust a weight of the second time series metrics in a subsequent iteration. These operations can further comprise, after the performing of the iterations, storing the memory pool according to the adjusted respective sizes.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 2:
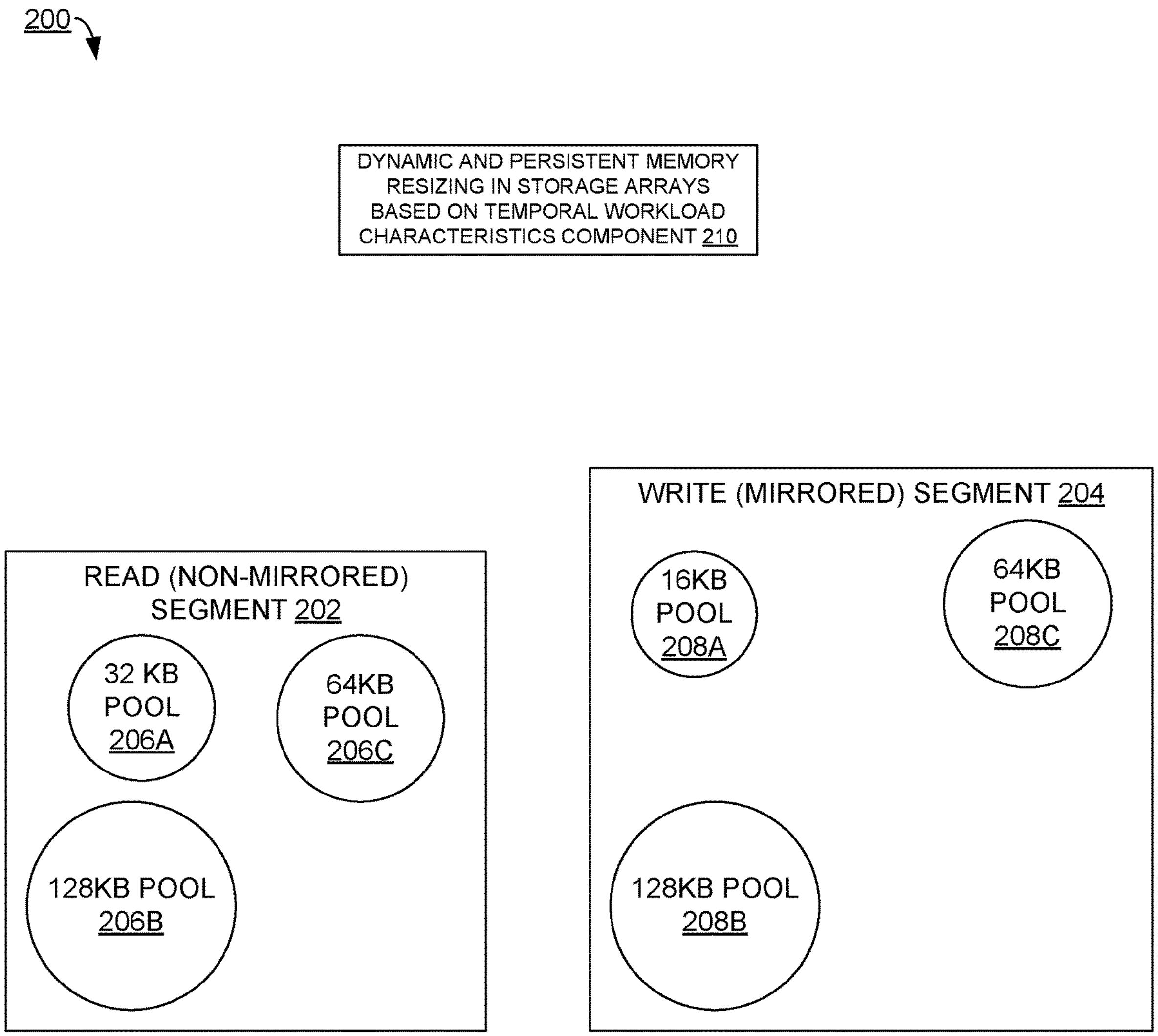
FIG. 2 illustrates an example Tier 1 memory pool that can facilitate dynamic and persistent memory resizing in storage arrays based on temporal workload characteristics, in accordance with an embodiment of this disclosure.

Next generation storage systems can benefit from innovations in data caching features. It can be that a data cache can be divided into "cache segments" (as shown in FIG. 2)—where each cache segment provides its own cache slot size (or smallest unit of memory allocation) and mirroring attributes. In some examples, typical slot sizes used are 16 kilobytes (KB), 64 KB, and 128 KB, and the memory allocated can either be mirrored (for write I/Os) or non-mirrored (for read I/Os). This segmented cache configuration can improve memory utilization efficiency and I/O performance.

In some examples, read I/O from the array can be stored in non-mirrored memory, because a persistent copy already exists on disk. Mirrored memory can be used to store incoming write I/O until it is destaged to disk. In some examples, two copies of incoming write data are maintained in the main memory for redundancy. Once destaged, the data can move to non-mirrored memory, which can require half the memory capacity relative to mirrored memory, and so be cheaper. If the data is being over-written (e.g., written again to the same location) it can be moved back to mirrored memory. A memory management approach to address these problems can reduce a cost of a storage array to users. Dynamic random-access memory (DRAM) can be considered to be Tier 1 memory in a storage array; and storage class memory (SCM) and other persistent memory can be considered to be Tier 2 memory in the array.

A difference between DRAM and persistent memory can relate to persistence. DRAM can generally comprise non-persistent memory, where stored data can be overwritten without direct user intervention or lost when a computer that houses the DRAM is power cycled. In contrast, persistent memory can generally continue to store data unless there is a specific instruction from a user to delete that data, and it can continue to be stored when a computer is power cycled.

While examples described herein can describe particular types of memory used (e.g., DRAM), it can be appreciated that the present techniques can be applied to scenarios where other types of memory are used.

There can be problems associated with resizing Tier 1 and 2 memories dynamically. In this area, the present techniques can be implemented to analyze temporal workload characteristics to resize correlated Tier 1 and Tier 2 memories to improve I/O performance.

In some prior approaches to caching, all the available Tier 1 and Tier 2 memory are formatted into fixed slot size of 128 KB. Additionally, it can be that all data cache is typically mirrored to provide enough redundancy/data protection in event of memory failover, sudden memory board power outage, etc. This static cache config can be detrimental to I/O performance, and inefficient in memory utilization. That is, it can be that prior approaches do not implement dynamic resizing of Tier 1 and Tier 2 memory, as described with respect to the present techniques.

The present techniques can be implemented to optimize storage node memory division into tiered memory regions. While examples herein can relate to optimizations, it can be appreciated that the present techniques can be implemented such that an improved outcome can be obtained, though it may not be the optimal outcome.

A goal of the present techniques can be to use a least amount of storage node DRAM memory in a most effective way. The present techniques can involve using autoregressive integrated moving average (ARIMA) time series techniques to create a run time model that can assist in monitoring and automatically adjusting memory region sizes. An ARIMA model can capture short- and long-term time series characteristics such as burst, seasonality, trends etc.

In some examples, ARIMA model forecasting can forecast an incorrect outcome due to change in customer workloads. In such examples, to do course corrections a negative and positive feedback mechanism can be implemented by leveraging reinforcement learning (RL) techniques of exploration of new information and exploitation of known information to improve an accuracy of forecasting over a long horizon. It can be that prior approaches do not combine ARIMA and reinforcement learning techniques.

The present techniques can be implemented to optimize a division between mirrored and un-mirrored memory regions. A decision to convert from non-mirrored to mirrored memory (and vice versa) can have ripple implications. For example, in heavy write I/O loads, it can be that more mirrored memory is needed to store the written data. Converting un-mirrored memory to mirrored memory can reduce an amount of available unmirrored memory considerably, which in turn, can cause a flush out of read I/O data that is accessed heavily. Such a flush can cause future read misses (since the tracks were frequently accessed (sometimes referred to as being red hot) in the first place). This, in turn, can increase an internal workload to bring data from disk and incur a response time penalty to host read I/Os.

In this context, instead of evicting hot read I/O data from an unmirrored global memory (GM), it can be better to move this hot data to a lower performing memory region (which can function as SWAP memory, where virtual memory for a higher memory tier is implemented with a lower tier), so that future READs can be serviced out of this lower tier memory (which can still be faster than disk). The present techniques can provide a process by which I/Os can be relocated from slower persistent memory (e.g., flash memory, a Serial Attached Small Consumer System Interface (SCSI) (SAS)

drive, or a SCM drive) to a faster memory region (e.g., DRAM) using ARIMA and reinforcement learning techniques.

Cache memory management can generally use a variation of a least recently used (LRU) technique. The present techniques can be implemented to replace an approach that uses data eviction (e.g., data is removed from memory) with an approach that moves data to a slower memory tier—e.g., copy LRU data (mirrored or unmirrored) to larger (and slower) memory regions, and purge them from the fast memory. This can help reduce an I/O response time, as the moved data can still be accessed using a memory rather than disk.

An advantage of the present techniques can relate to decision-making on what data to move to a lower tier memory, instead of evicting it, by controlling positive and negative feedbacks of ARIMA time series forecasting. Workload can be directly proportional to a workload on a device, board, or collection of boards (e.g., engine). ARIMA forecasting time series analysis can be used to analyze "per board" memory usage (what should be used for "global memory" mirrored or non-mirrored memory, what should be used for local memory, etc.), and the memory segments sizes (bigger or smaller, per the incoming I/O profile). This analysis can facilitate determining the change rates needed (from mirrored memory to non-mirrored, and vice versa), and the memory chunk sizes (e.g., sequential write I/O data can be better stored in bigger memory chunks). The analysis can also be correlated to a number of read and write misses (a write I/O miss can occur when the write I/O data is not in cache/write memory) arriving to the unmirrored and mirrored memory regions. These I/O block regions can help to deduce a size of a swap memory area.

An example of the present techniques can involve determining the following. At each time period, T:

The "red hot" data regions locations (block addresses) can be read per device, per mirrored and unmirrored memory region.

The Read and Write misses statistics per these memory regions can be determined.

A relation between Read and Write misses and the regions (mirrored/non-mirrored) sizes can indicate optimal memory sizes (mirrored and non-mirrored). If a certain data block region (logical block addressing (LBA) range) has a larger number of read I/O and write I/O misses, that can indicate that the cache segment sizing is too small (e.g., more mirrored memory is needed to hold the larger number of incoming write I/O data for that block range). It can also mean that a swap memory (which can be lower performing memory than the primary memory) can help (by moving data falling off the LRU to the swap memory). The read I/O and write I/O misses (around the same LBA regions) can be used as feedback to the algorithm, such as to improve the cache segment sizing for the primary memory regions. Such feedback can help to improve assigned tiered memory regions (swap memory) and primary memory cache segment sizes.

The above techniques can use the "rate of change of mirrored and unmirrored cache segment size" and corelate them with the LBA regions (identified by ARIMA forecasting per device I/O stream) to determine ideal memory chunks sizes. A long-term sizing technique can use the "rate of changes of memory size" over a longer run (e.g., days, weeks, months) to determine an ideal memory size for the complete box for a variety of workloads across different time periods—time-of-day, day-of-week, day-of-month, weeks, months etc. Users can use such long-term sizing techniques to buy required memory sizes(s) for their workloads.

By implementing the present techniques to better determine the sizes of tiered memory regions (e.g., mirrored, non-mirrored, and slower memory technology) lower latency (and remote direct memory access (RDMA)-like capabilities) can be obtained to persists data at lower costs. This smarter memory sizing can allow for better memory usage, which can mean that the current resources can be used in a better way, and fewer such costly resources can be purchased. When the memory tiers are sized properly for a current workload, incoming "hot" data regions can persist in the main memory (mirrored), thus reducing access time. Once destaged, a region can be moved to a lower tier (e.g., non-mirrored or lower performing technology).

The present techniques can be applied to other areas, such as:

1. To reduce latency/access-time in a node failover scenario: fail-over to the node (board/director) with the mirrored data. This can reduce the data time.
2. To reduce latency and access times of "metadata rebuilds" (if the system uses metadata): when rebuilding the metadata, the node with the mirrored metadata can perform the rebuild. This can be faster than rebuild from disk.
3. An active-active remote replication: have the replication job consume statistics from both arrays for a certain device and apply the recommendation on both arrays. This can create a smoother (performance wise) access times regardless of array used. If the analysis results take only one array into consideration, then if the application fails over to the other array, it can have different (and worse) performance.
4. Provide a capability to know when to adjust/leverage memory region size (short and long term) of the main memory based on tolerances and expectations set by the user for their workloads, and based on historic and recent workloads. This can produce flexible memory sizes for mirrored and unmirrored cache data segments. When needed, more memory will be requested from the system. When the load declines, the system can shrink the memory region sizes and hand back memory to other system usages. This can be accomplished by providing the capability to tune itself to take corrective action when certain memory types should be used or not.

The present techniques can be implemented through a combination of ARIMA and positive and negative feedback from reinforcement learning. This approach can be implemented to gradually learn to increase or decrease Tier1 and Tier2 memory regions, and observe the effect of these changes on I/O operations per second (IOPS), response time (RT), and fall thru time (FTT) of cache slots used to hold customer data. Where the effects are positive, then tiers can gradually be moved in that direction (e.g., increasing their size), and otherwise the direction can be changed, and respective tier memory regions can be decreased to improve IOPS, RT, and FTT metrics. When the model sees the learning to exploration is saturated (that is, further changing the sizing of Tier 1 and Tier 2 will not have much impact on the metrics) then it can leverage this learning to exploit the sizing values of Tier 1 and Tier 2 memory regions.

An advantage of the present techniques can relate to decision making on what data to move to a lower tier memory instead of evicting by controlling the positive and negative feedbacks to ARIMA time series forecasting. Relative to prior approaches, the present techniques can be implemented to better determine the sizes of tiered memory regions (mirrored, non-mirrored, and slower memory technology), which can allow for obtaining lower latency (and RDMA-like capabilities) to persist data at lower costs. A fall thru rate control technique can be used as input to control the positive and negative feedbacks.

The preset techniques can be implemented to utilize a time series dimension. Some ARIMA models can make incorrect forecasts due to a change in customer workloads. With the present techniques, to do course corrections, a negative and positive feedback mechanism can be implemented by leveraging reinforcement learning techniques to improve an accuracy of forecasting over a long time horizon. Prior techniques can omit a combination of ARIMA with reinforcement learning, and it can further be that the combination has not been applied to a memory resizing problem.

Resizing a storage array can depend on the memory in the array. In an example where there is a terabyte (or more of memory), then it can take time to resize storage arrays, which can create a lower-bound time to perform resizing operations.

Capturing user workload patterns over a time window (e.g., 1 or 2 hours) can reduce a variation in a time involved with performing resizing operations. Where a decision is made every 5 minutes, this can create overhead to the array, because it can be that variations of a workload are chased instead of capturing underlying characteristics of the workload. This time window can be a hyperparameter that a user can select, and a lower bound can be implemented based on an amount of memory on a computer, and based on workload analysis (where the hyperparameter can be selected to create a balance between cost and improvement).

In some examples, Tier 1 and Tier 2 memory segment sizes can be dynamically resized while workloads are running on the array.

In some examples, resizing Tier 1 memory can comprise adjusting an amount of mirrored and non-mirrored segments within Tier 1, while keeping a total size of Tier 1 memory constant. Based on a change in the mirrored and non-mirrored segments, a size of Tier 2 memory can be changed.

For example, where Tier 1 (DRAM) size is 100 gigabytes (GB), it can be that it cannot be changed to 200 GB dynamically. Instead, 100 GB of Tier 1 memory can be dynamically split between 40% non-mirrored segment and 60% mirrored segment based on forecasting. Within each segment, there can be different pool sizes, such as 128 KB read size 1, 32 KB read size 2, 64 KB read size 3, 16K Write size 4, 64 KB write size 5, 128 KB write size 6, etc. After Tier 1 dynamic segment and pool sizes are forecasted, it can result in a Tier 2 size prediction. If the memory that is used to store Tier 2 memory has a size of 800 GB, then it can be that 300 GB can be used for Tier 2, and the other 500 GB is used for user data. This Tier 2 300 GB size can dynamically increase or decrease based on how much space the user data consumes of the other 500 GB. Where the user data does not consume 100% of 500 GB in this example, then some of it can be used to increase the Tier 2's 300 GB size based on an ARIMA-and-RL model recommendation, according to the present techniques. Similarly, if the user data space is fully utilized (500 GB) then the Tier 2 memory can give back part of its 300 GB to new user data as needed.

Put another way, it can be that Tier 1 memory size is not dynamically increased or decreased, but within the Tier 1 memory, the segment and pool sizes can vary dynamically based on workload forecasting. On the other hand, it can be that a Tier 2 memory size can dynamically increase of decrease and consumes In some examples, a storage array comprises multiple engines. Each engine can be made up of two boards/directors. Each board can have its own Tier 1 and Tier 2 memory. When a memory pool resizing according to the present techniques is implemented, this can be done at the per-board level. It could be that each board has a different sizing compared to other boards in the storage array. Red-hot data regions can be analyzed per board in the storage array.

Example Architectures, Etc

Figure 1:
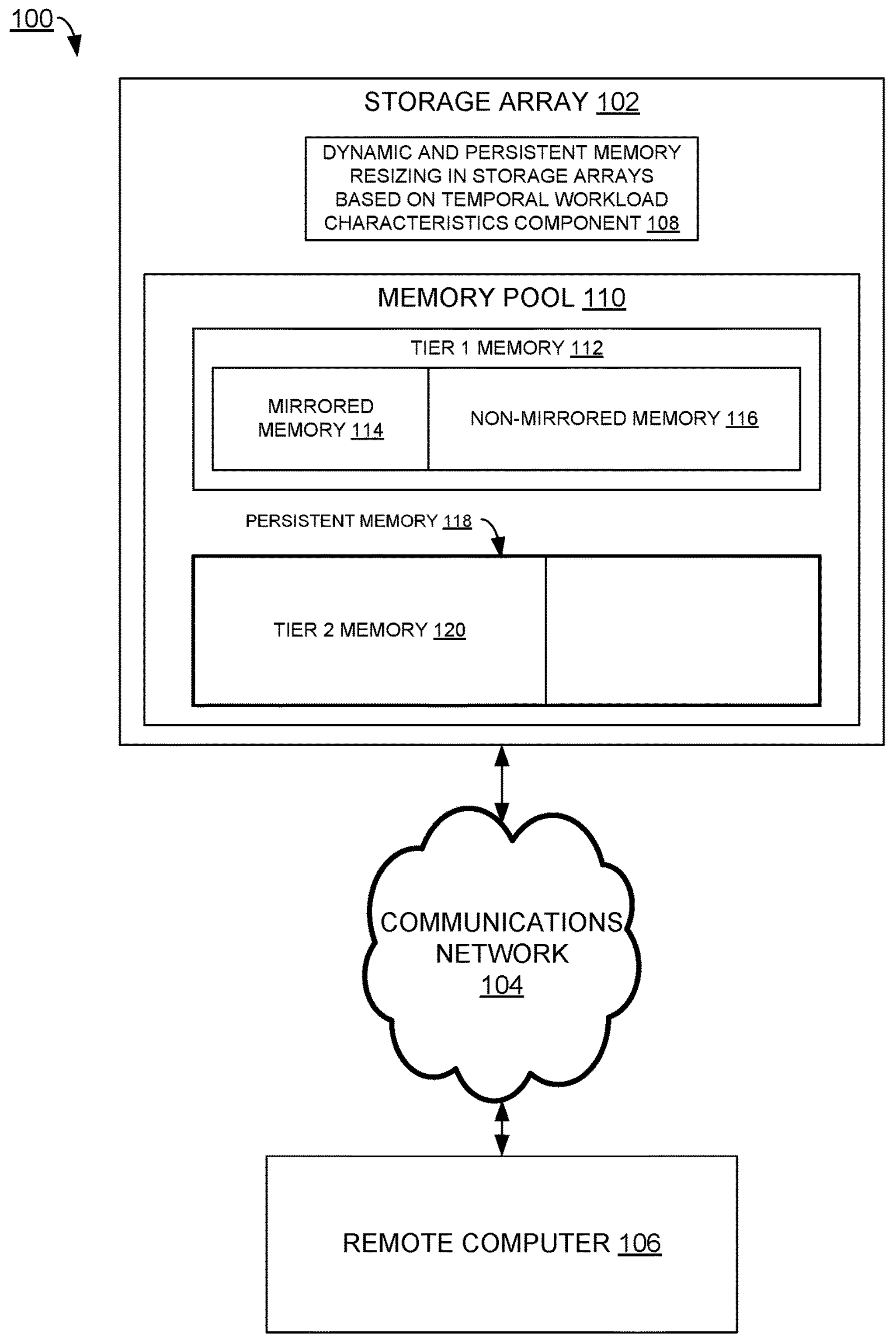
FIG. 1 illustrates an example system architecture that can facilitate dynamic and persistent memory resizing in storage arrays based on temporal workload characteristics, in accordance with an embodiment of this disclosure.

FIG. 1 illustrates an example system architecture 100 that can facilitate dynamic and persistent memory resizing in storage arrays based on temporal workload characteristics, in accordance with an embodiment of this disclosure.

System architecture 100 comprises storage array 102, communications network 104, and remote computer 106. In turn, storage array 102 comprises dynamic and persistent memory resizing in storage arrays based on temporal workload characteristics component 108, memory pool 110, Tier 1 memory 112, mirrored memory 114, non-mirrored memory 116, persistent memory 118, and Tier 2 memory 120.

Figure 13:
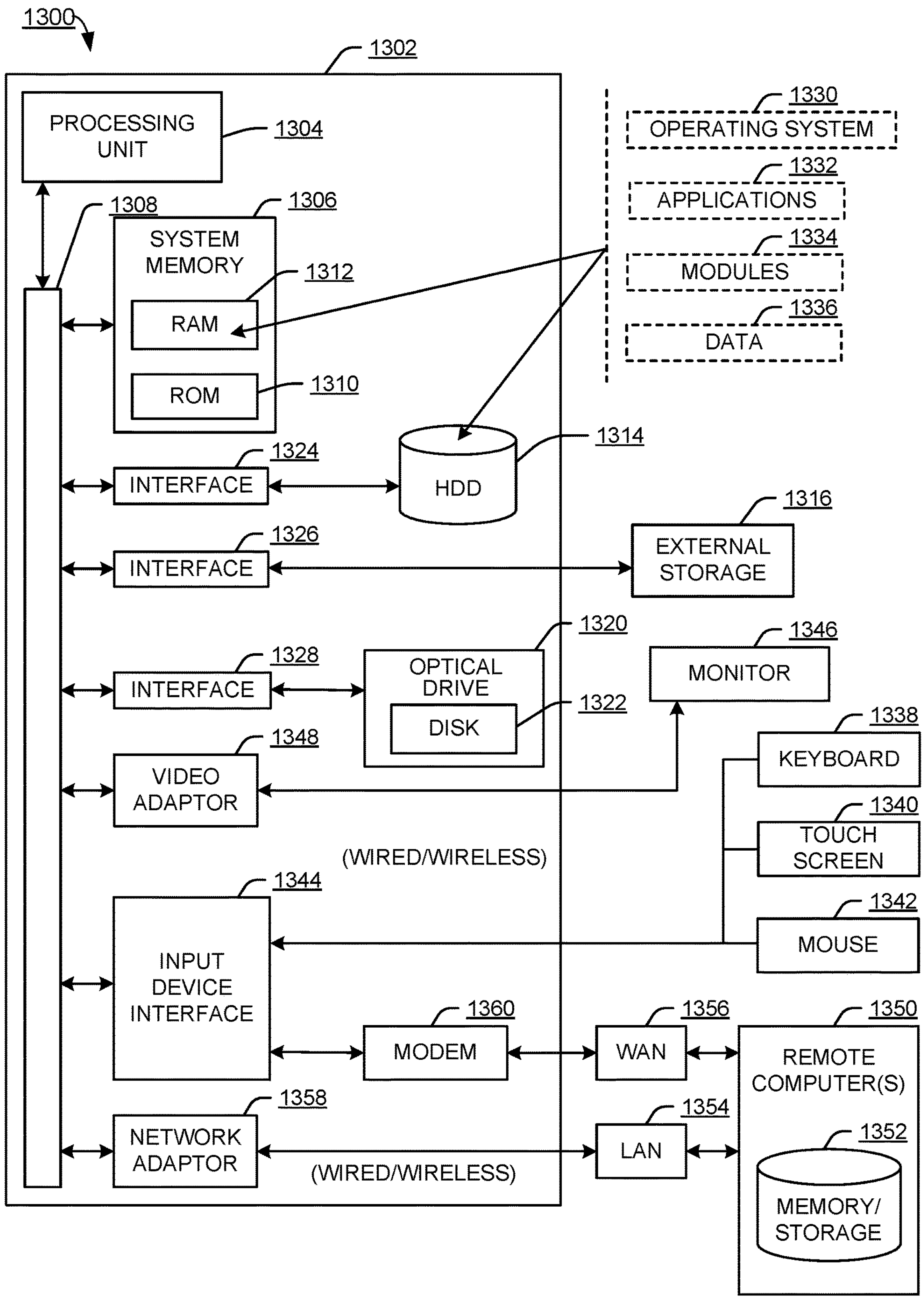
FIG. 13 illustrates an example block diagram of a computer operable to execute an embodiment of this disclosure.

Each of storage array 102 and/or remote computer 106 can be implemented with part(s) of computing environment 1300 of FIG. 13. Communications network 104 can comprise a computer communications network, such as the Internet.

It can be appreciated that some implementations of a storage array can comprise multiple instances of memory pool 110, and that FIG. 1 is simplified to illustrate certain components.

Storage array 102 can store and provide access to computer data, such as by servicing data read and write requests received from remote computer 106 via communications network 104. As part of reading and/or writing data, storage array 102 can utilize memory pool 110, which can comprise Tier 1 memory 112 and Tier 2 memory 120 (where Tier 1 memory 112 can be both more performant and smaller than Tier 2 memory 120). Tier 1 memory 112 can comprise mirrored memory 114 (for writes) and non-mirrored memory 116 (for reads). Tier 2 memory 120 can comprise a portion of persistent memory 118.

Dynamic and persistent memory resizing in storage arrays based on temporal workload characteristics component 108 can dynamically resize memory pool 110. It can be that a size of Tier 1 memory 112 is fixed, and that resizing Tier 1 memory 112 comprises adjusting sizes of mirrored memory 114 and non-mirrored memory 116 within this fixed total size (e.g., increasing mirrored memory 114 and decreasing non-mirrored memory 116, or decreasing mirrored memory 114 and increasing non-mirrored memory 116).

Then, it can be that a size of Tier 2 memory 120 can be adjusted within persistent memory 118, where a portion of persistent memory 118 not used by Tier 2 memory 120 can be used to store user data. In some examples, dynamic and persistent memory resizing in storage arrays based on temporal workload characteristics component 108 can determine how to resize Tier 1 memory 112, and then determine how to resize Tier 2 memory 120 based on this resizing of Tier 1 memory 112.

Figure 10:
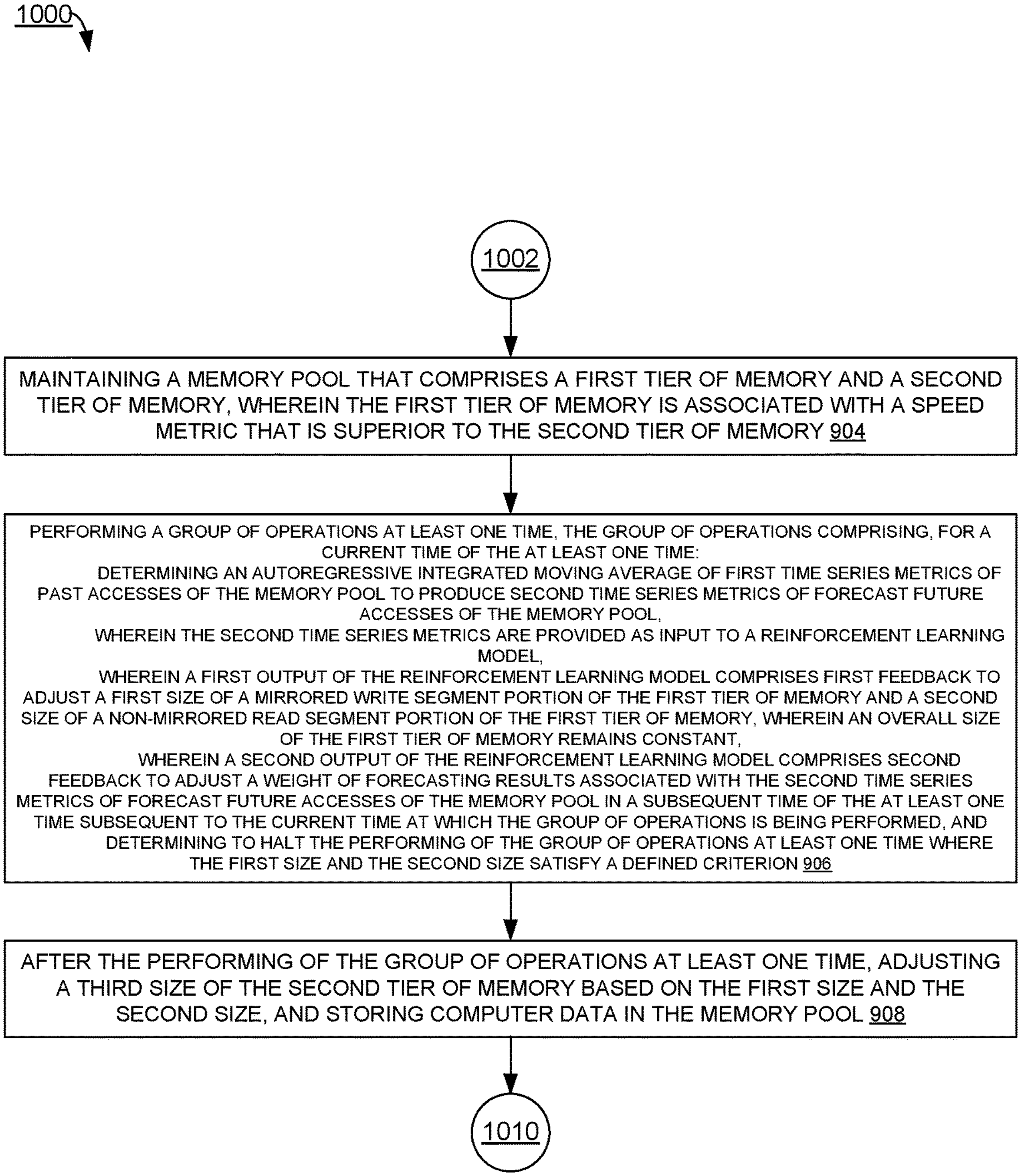
FIG. 10 illustrates an example process flow that can facilitate dynamic and persistent memory resizing in storage arrays based on temporal workload characteristics, in accordance with an embodiment of this disclosure.
Figure 11:
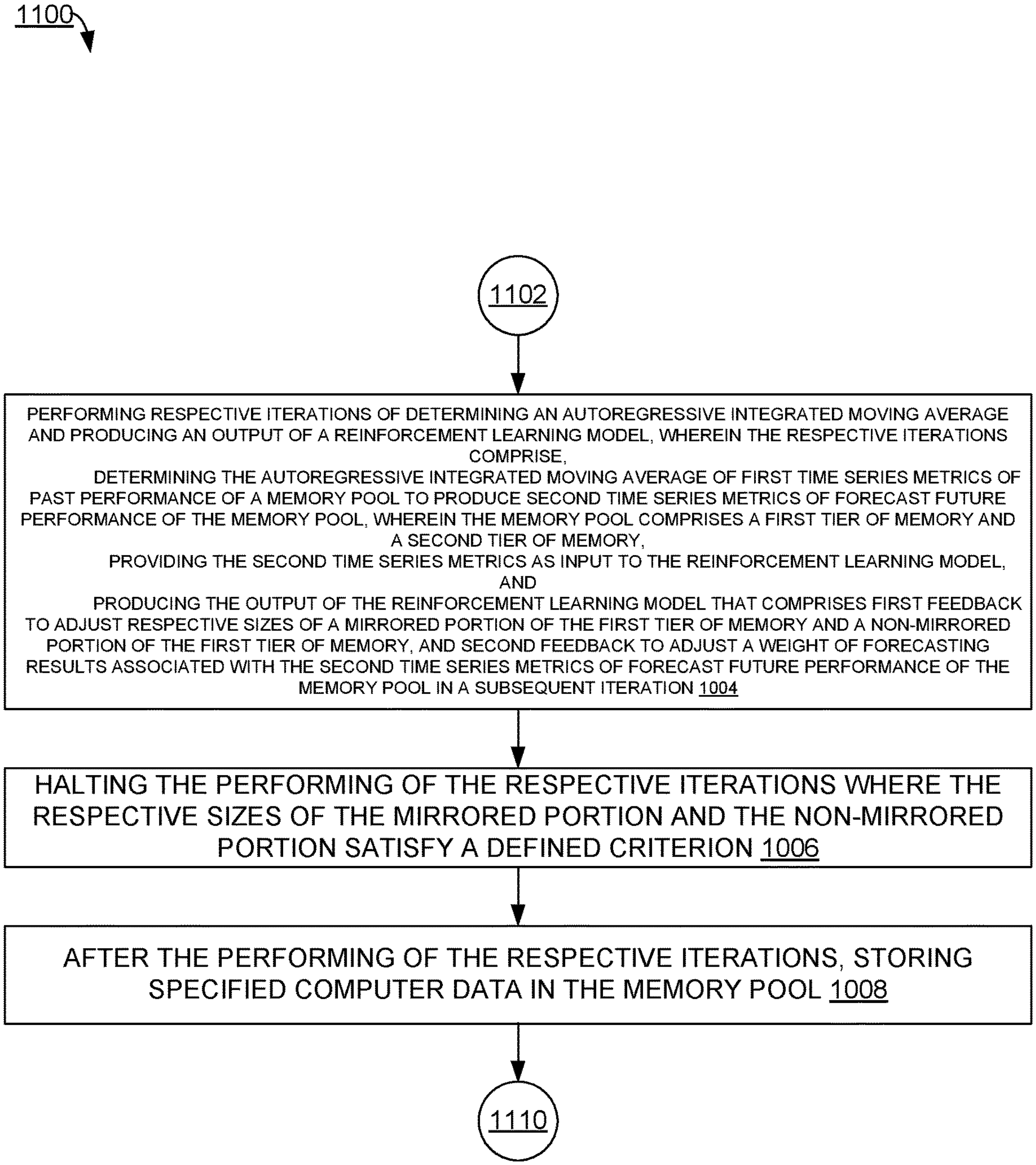
FIG. 11 illustrates another example process flow that can facilitate dynamic and persistent memory resizing in storage arrays based on temporal workload characteristics, in accordance with an embodiment of this disclosure.
Figure 12:
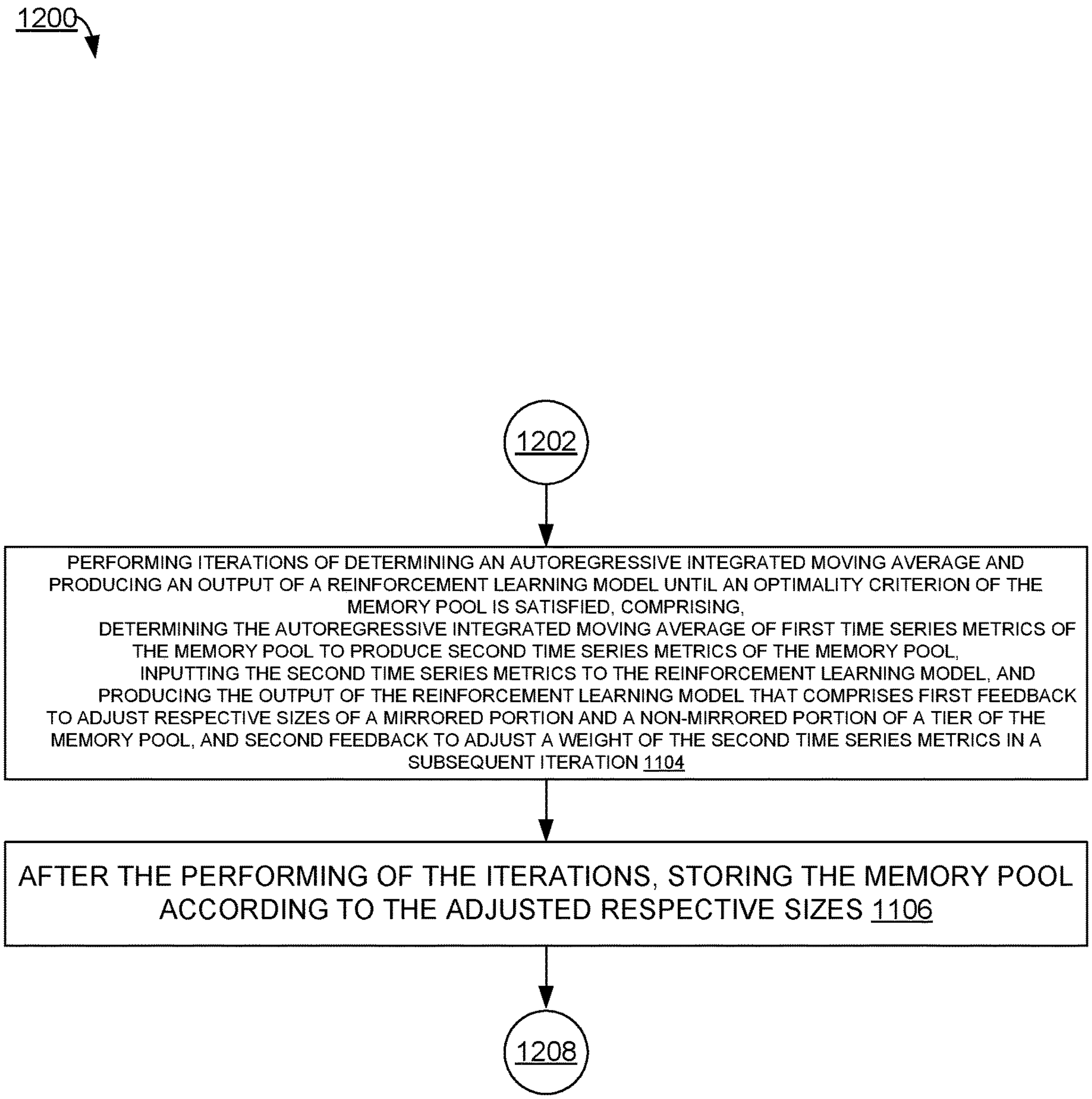
FIG. 12 illustrates another example process flow that can facilitate dynamic and persistent memory resizing in storage arrays based on temporal workload characteristics, in accordance with an embodiment of this disclosure.

In some examples, dynamic and persistent memory resizing in storage arrays based on temporal workload characteristics component 108 can implement part(s) of the process flows of FIGS. 10-12 to implement dynamic and persistent memory resizing in storage arrays based on temporal workload characteristics.

It can be appreciated that system architecture 100 is one example system architecture for dynamic and persistent memory resizing in storage arrays based on temporal workload characteristics, and that there can be other system architectures that facilitate dynamic and persistent memory resizing in storage arrays based on temporal workload characteristics.

FIG. 2 illustrates an example Tier 1 memory pool 200 that can facilitate dynamic and persistent memory resizing in storage arrays based on temporal workload characteristics, in accordance with an embodiment of this disclosure. In some examples, part(s) of FIG. 2 can be used to implement part(s) of system architecture 100 of FIG. 1 to facilitate persistent memory resizing in storage arrays based on temporal workload characteristics.

Tier 1 memory pool 200 comprises read (non-mirrored) segment 202, write (mirrored) segment 204, 32 kilobyte (KB) pool 206A, 128 KB pool 206B, 64 KB pool 206C, 16 KB pool 208A, 12A 8 KB pool 208B, 64 KB pool 208C, and dynamic and persistent memory resizing in storage arrays based on temporal workload characteristics component 210 (which can be similar to dynamic and persistent memory resizing in storage arrays based on temporal workload characteristics component 108 of FIG. 1).

Read (non-mirrored) segment 202 can be similar to non-mirrored memory 116 of FIG. 1, and write (mirrored) segment 204 can be similar to mirrored memory 114. As depicted, read (non-mirrored) segment 202 comprises three pools—32 KB pool 206A, 128 KB pool 206B, 64 KB pool 206C. And, write (mirrored) segment 204 comprises three pools—16 KB pool 208A, 128 KB pool 208B, and 64 KB pool 208C.

FIG. 2 illustrates an example of storage array (read and write) memory segmentation and various pool sizes that can be dynamically resized by dynamic and persistent memory resizing in storage arrays based on temporal workload characteristics component 210.

Figure 3:
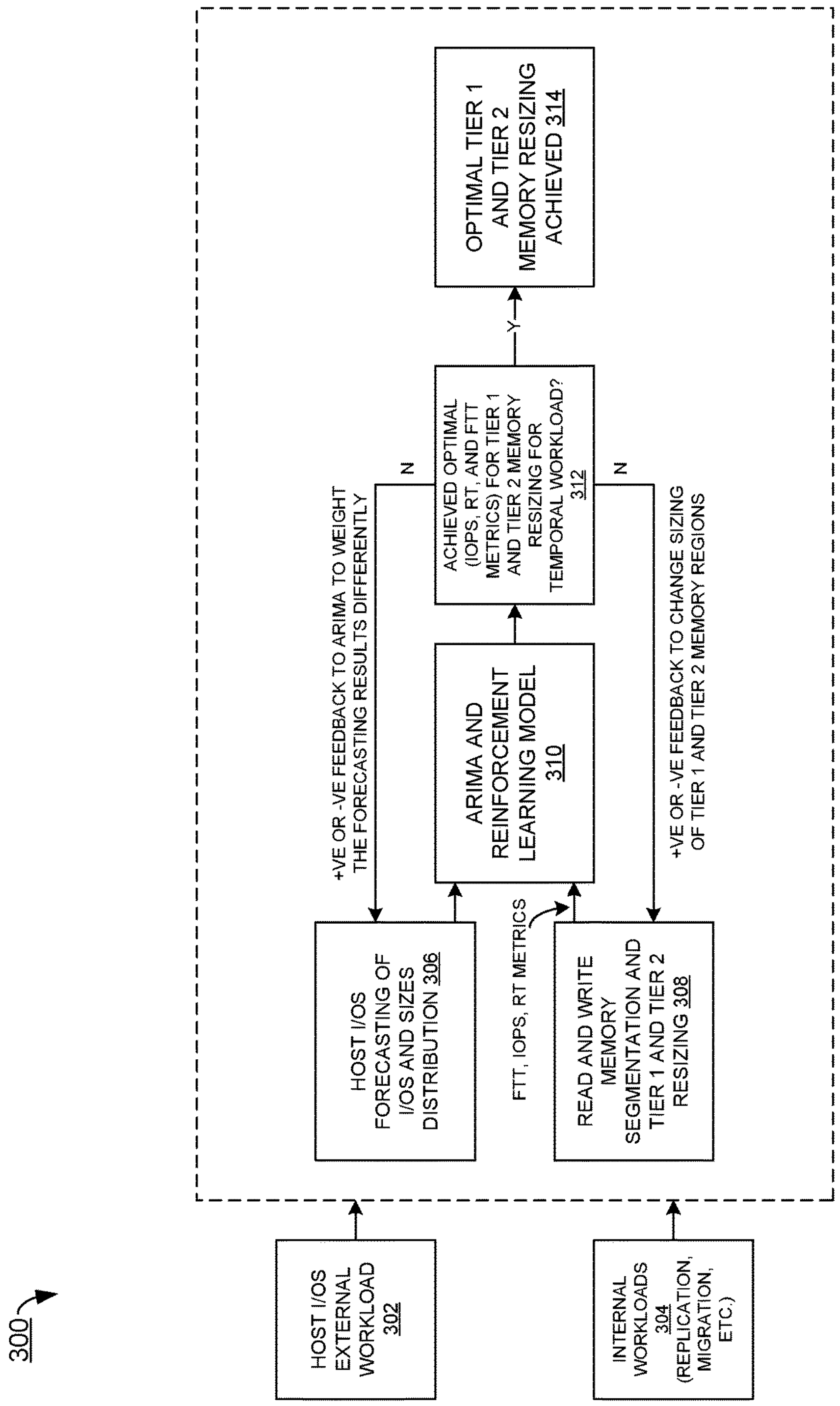
FIG. 3 illustrates another example system architecture that can facilitate dynamic and persistent memory resizing in storage arrays based on temporal workload characteristics, in accordance with an embodiment of this disclosure.

FIG. 3 illustrates another example system architecture 300 that can facilitate dynamic and persistent memory resizing in storage arrays based on temporal workload characteristics, in accordance with an embodiment of this disclosure. In some examples, part(s) of FIG. 3 can be used to implement part(s) of system architecture 100 of FIG. 1 to facilitate persistent memory resizing in storage arrays based on temporal workload characteristics.

System architecture 300 comprises host I/Os external workload 302, internal workloads 304 (replication, migration, etc.), host I/Os forecasting of I/Os and sizes distribution 306, read and write memory segmentation and Tier 1 and Tier 2 resizing 308, ARIMA and reinforcement learning model 310, achieved optimal (IOPS, RT, and FTT metrics) for Tier 1 and Tier 2 memory resizing for temporal workload? 312, and optimal Tier 1 and Tier 2 memory resizing achieved 314.

In this manner, ARIMA and RL techniques can be combined to facilitate dynamic and persistent memory resizing in storage arrays based on temporal workload characteristics.

Figure 4:
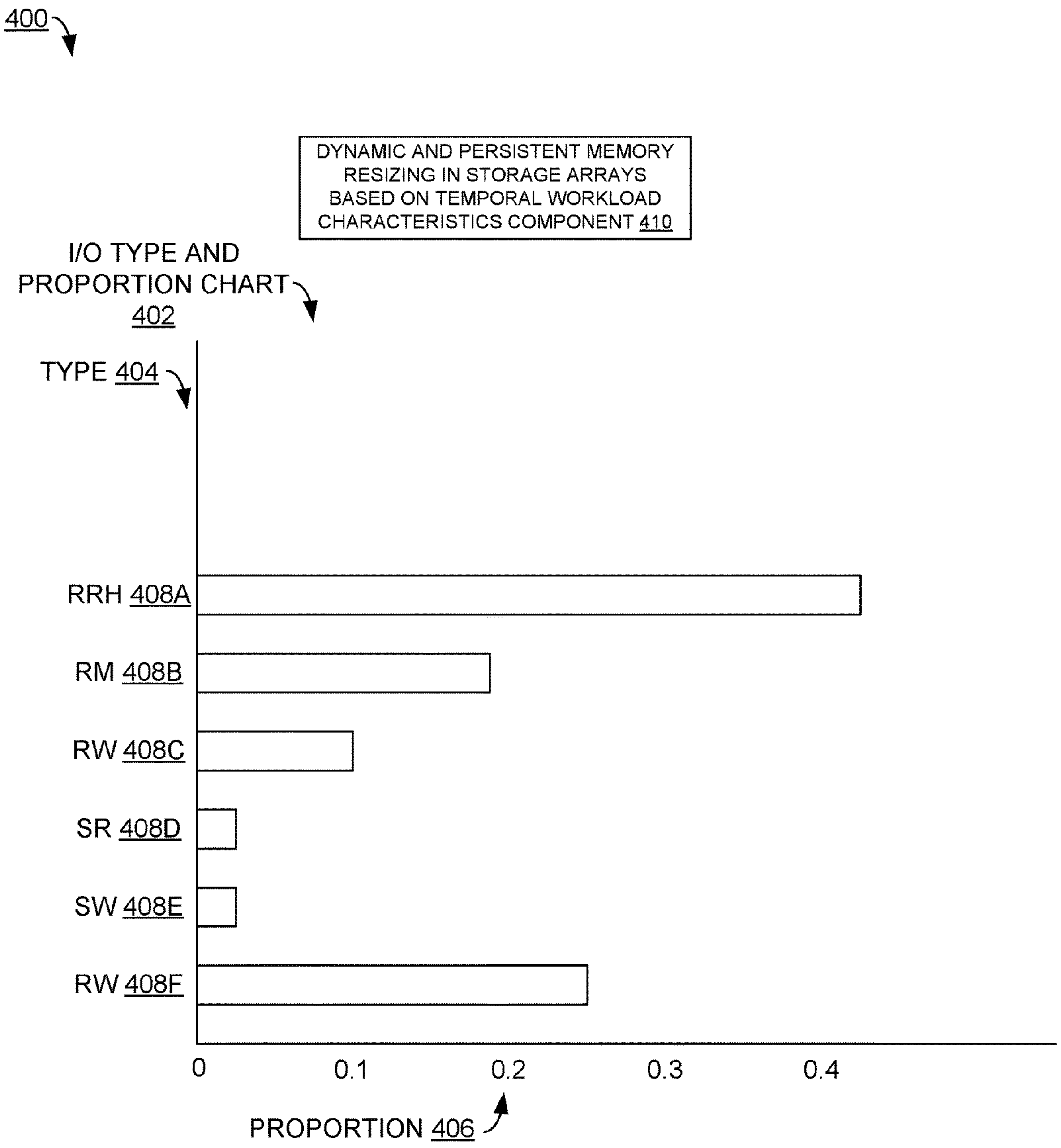
FIG. 4 illustrates example input/output (I/O) that can facilitate dynamic and persistent memory resizing in storage arrays based on temporal workload characteristics, in accordance with an embodiment of this disclosure.

FIG. 4 illustrates example I/O 400 that can facilitate dynamic and persistent memory resizing in storage arrays based on temporal workload characteristics, in accordance with an embodiment of this disclosure. In some examples, part(s) of FIG. 4 can be used to implement part(s) of system architecture 100 of FIG. 1 to facilitate persistent memory resizing in storage arrays based on temporal workload characteristics.

I/O 400 comprises I/O type and proportion chart 402, type 404, proportion 406, random read hit (RRH) 408A, random read miss (RM) 408B, read write (RW) 408C, sequential read (SR) 408D, sequential write (SW) 408E, random write hit (RW) 408F, and dynamic and persistent memory resizing in storage arrays based on temporal workload characteristics component 410 (which can be similar to dynamic and persistent memory resizing in storage arrays based on temporal workload characteristics component 108 of FIG. 1).

The different I/O sizes and types indicated in I/O type and proportion chart 402 can indicate I/O used by a storage array (e.g., storage array 102 of FIG. 1), and can used by dynamic and persistent memory resizing in storage arrays based on temporal workload characteristics component 410 to dynamically resize storage tiers of a memory pool.

Figure 5:
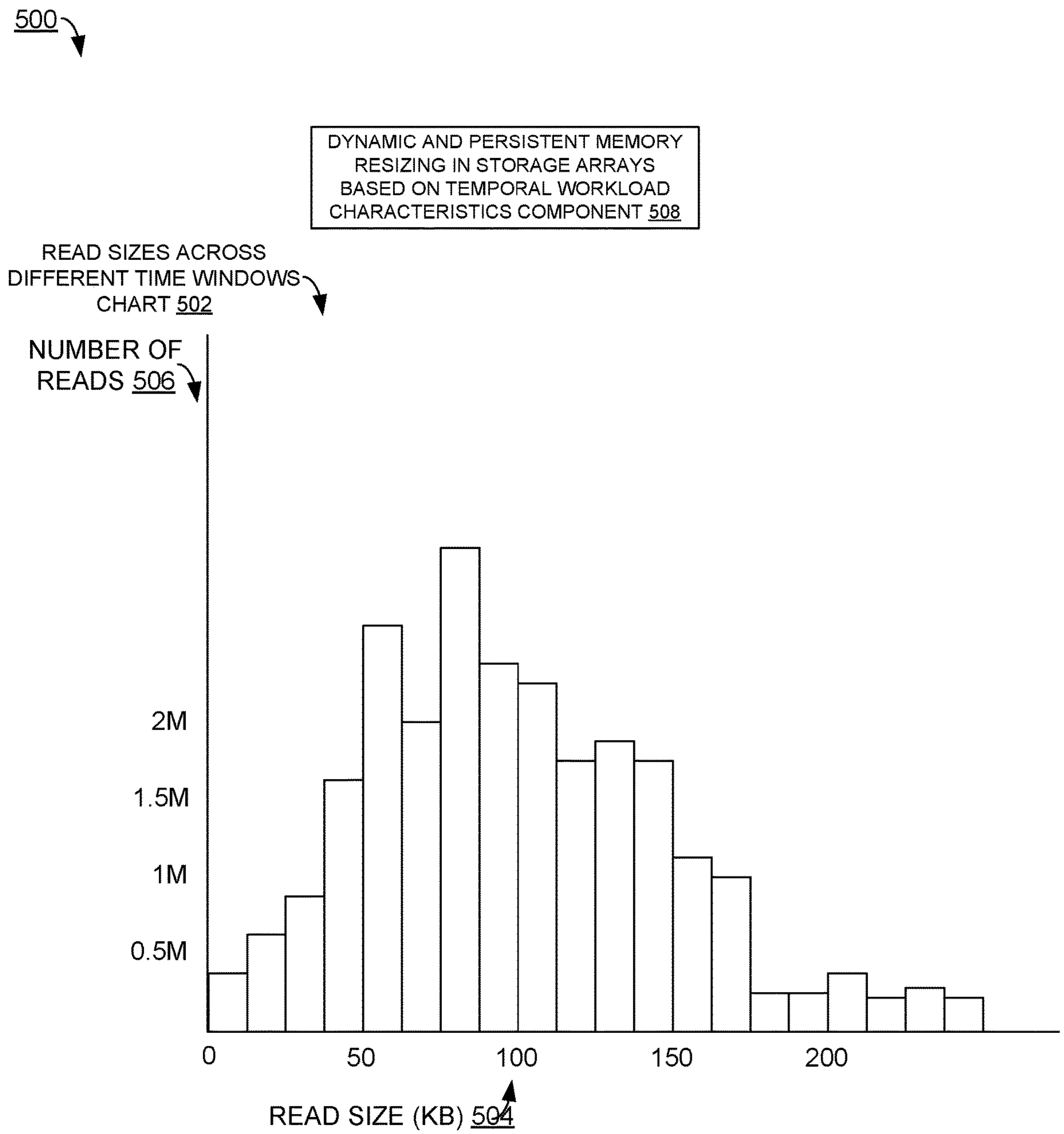
FIG. 5 illustrates example read sizes across different time windows that can facilitate dynamic and persistent memory resizing in storage arrays based on temporal workload characteristics, in accordance with an embodiment of this disclosure.

FIG. 5 illustrates example read sizes across different time windows 500 that can facilitate dynamic and persistent memory resizing in storage arrays based on temporal workload characteristics, in accordance with an embodiment of this disclosure. In some examples, part(s) of FIG. 5 can be used to implement part(s) of system architecture 100 of FIG. 1 to facilitate persistent memory resizing in storage arrays based on temporal workload characteristics.

FIG. 5 comprises read sizes across different time windows chart 502, read size 504, number of reads 506, and dynamic and persistent memory resizing in storage arrays based on temporal workload characteristics component 508 (which can be similar to dynamic and persistent memory resizing in storage arrays based on temporal workload characteristics component 108 of FIG. 1).

The different read sizes in read sizes across different time windows chart 502 can indicate read sizes performed by a storage array (e.g., storage array 102 of FIG. 1), and can used by dynamic and persistent memory resizing in storage arrays based on temporal workload characteristics component 508 to dynamically resize storage tiers of a memory pool.

Figure 6:
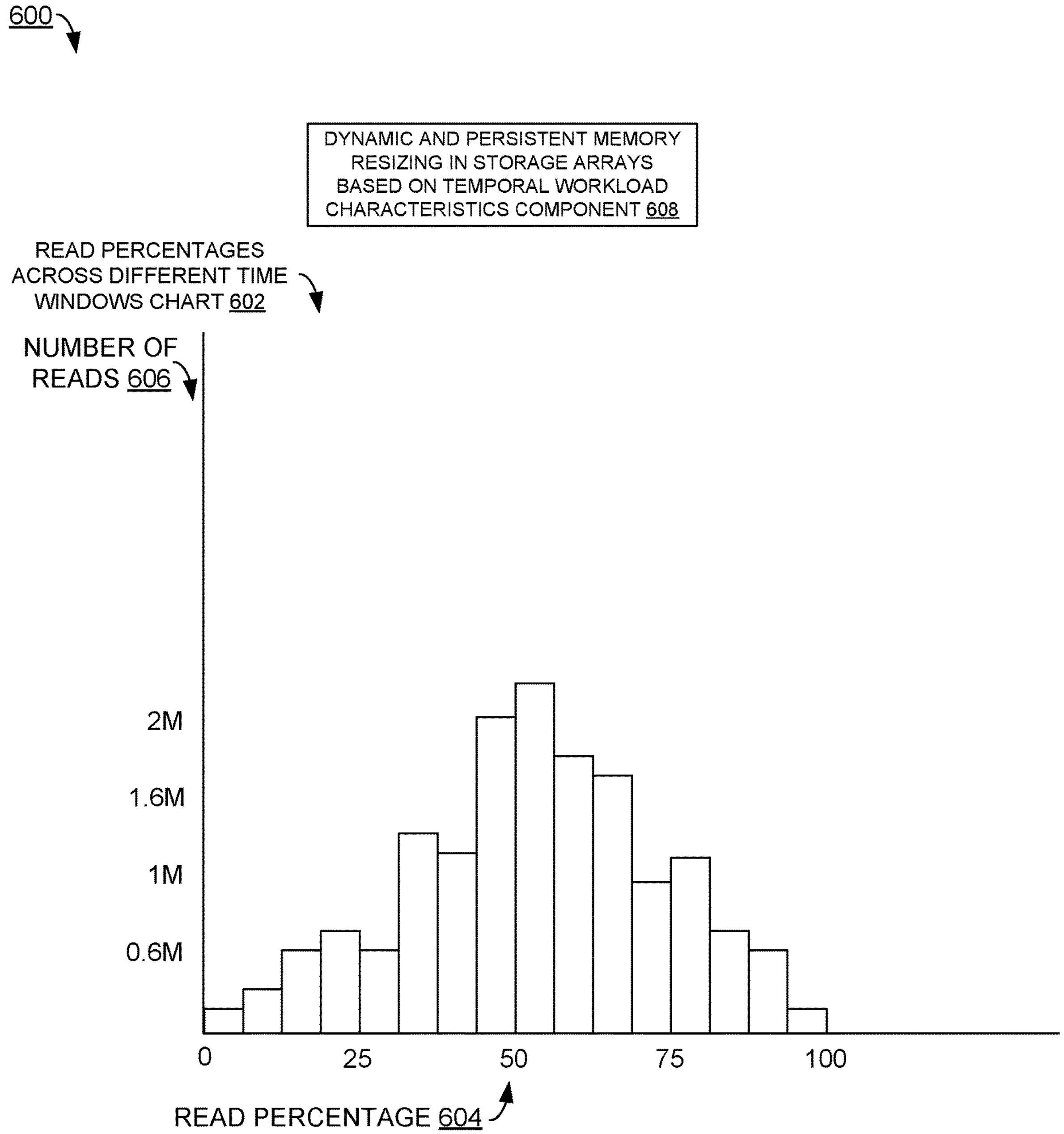
FIG. 6 illustrates example read percentages across different time windows that can facilitate dynamic and persistent memory resizing in storage arrays based on temporal workload characteristics, in accordance with an embodiment of this disclosure.

FIG. 6 illustrates example read percentages across different time windows 600 that can facilitate dynamic and persistent memory resizing in storage arrays based on temporal workload characteristics, in accordance with an embodiment of this disclosure. In some examples, part(s) of FIG. 6 can be used to implement part(s) of system architecture 100 of FIG. 1 to facilitate persistent memory resizing in storage arrays based on temporal workload characteristics.

FIG. 6 comprises read percentage across different time windows chart 602, read percentage 604, number of reads 606, and dynamic and persistent memory resizing in storage arrays based on temporal workload characteristics component 608 (which can be similar to dynamic and persistent memory resizing in storage arrays based on temporal workload characteristics component 108 of FIG. 1).

The different read percentages in read percentages across different time windows chart 602 can indicate read percentages performed by a storage array (e.g., storage array 102 of FIG. 1), and can used by dynamic and persistent memory resizing in storage arrays based on temporal workload characteristics component 608 to dynamically resize storage tiers of a memory pool.

Figure 7:
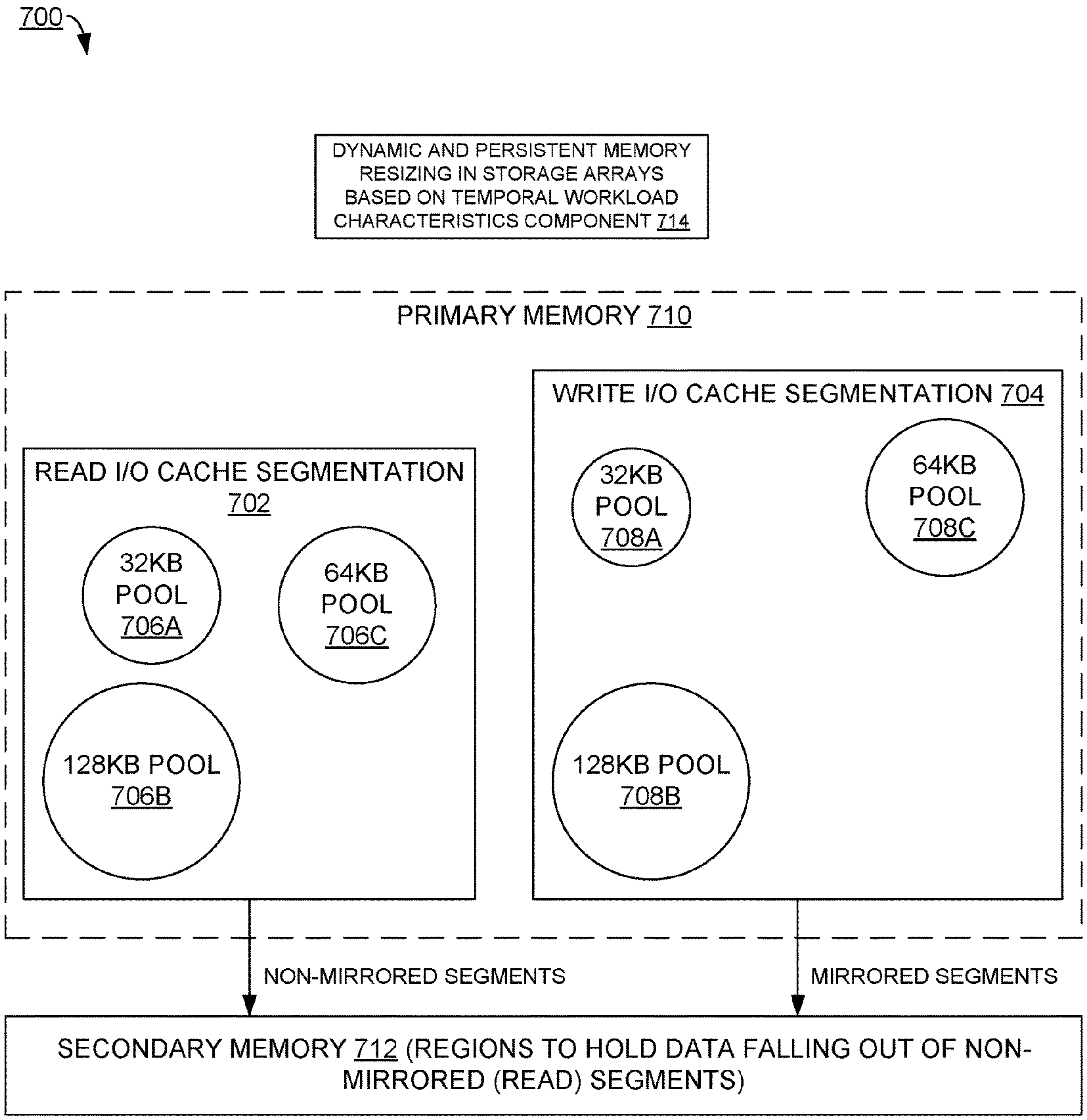
FIG. 7 illustrates an example Tier 1 and Tier 2 memory pool that can facilitate dynamic and persistent memory resizing in storage arrays based on temporal workload characteristics, in accordance with an embodiment of this disclosure.

FIG. 7 illustrates an example Tier 1 and Tier 2 memory pool 700 that can facilitate dynamic and persistent memory resizing in storage arrays based on temporal workload characteristics, in accordance with an embodiment of this disclosure. In some examples, part(s) of FIG. 7 can be used to implement part(s) of system architecture 100 of FIG. 1 to facilitate persistent memory resizing in storage arrays based on temporal workload characteristics.

Tier 1 and Tier 2 memory pool 700 comprises read I/O cache segmentation 702, write I/O cache segmentation 704, 32 KB pool 706A, 128 KB pool 706B, 64 KB pool 706C, 32 KB pool 708A, 128 KB pool 708B, 64 KB pool 708C, primary memory 710 (which can be considered to be Tier 1 memory), secondary memory 712 (regions to hold data falling out of non-mirrored (READ) segments) (which can be considered to be Tier 2 memory), and dynamic and persistent memory resizing in storage arrays based on temporal workload characteristics component 714 (which can be similar to dynamic and persistent memory resizing in storage arrays based on temporal workload characteristics component 108 of FIG. 1).

A recommendation to split memory into Non-mirrored (READ) segments and Mirrored (WRITE) segments with different pools and secondary memory segment sizes can be based on based on short-term time series characteristics such as burst and trend. It can be that secondary memory holds only data falling out of READ and WRITE segments. In this example, the secondary memory is smaller in size in the below diagram at time T compared to corresponding secondary memory at time T+1.

Dynamic and persistent memory resizing in storage arrays based on temporal workload characteristics component 714 can determine how to resize primary memory 710 and secondary memory 712. A result of this resizing can be seen in FIG. 8.

Figure 8:
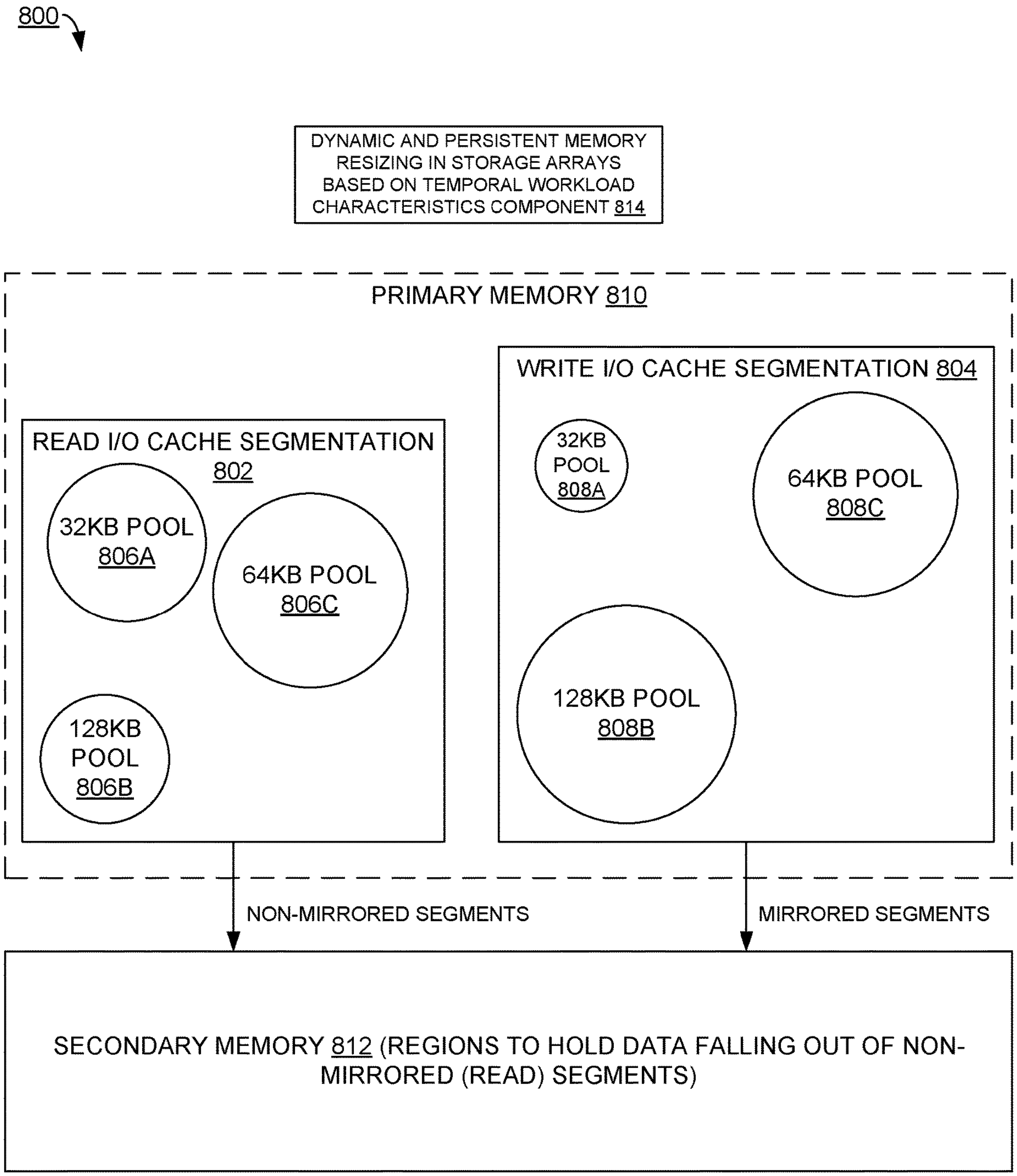
FIG. 8 illustrates another example Tier 1 and Tier 2 memory pool that can facilitate dynamic and persistent memory resizing in storage arrays based on temporal workload characteristics, in accordance with an embodiment of this disclosure.

FIG. 8 illustrates another example Tier 1 and Tier 2 memory pool 800 that can facilitate dynamic and persistent memory resizing in storage arrays based on temporal workload characteristics, in accordance with an embodiment of this disclosure. In some examples, part(s) of FIG. 8 can be used to implement part(s) of system architecture 100 of FIG. 1 to facilitate persistent memory resizing in storage arrays based on temporal workload characteristics.

Tier 1 and Tier 2 memory pool 800 comprises read I/O cache segmentation 802, write I/O cache segmentation 804, 32 KB pool 806A, 128 KB pool 806B, 64 KB pool 806C, 32 KB pool 808A, 128 KB pool 808B, 64 KB pool 808C, primary memory 810 (which can be considered to be Tier 1 memory), secondary memory 812 (regions to hold data falling out of non-mirrored (READ) segments) (which can be considered to be Tier 2 memory), and dynamic and persistent memory resizing in storage arrays based on temporal workload characteristics component 814 (which can be similar to dynamic and persistent memory resizing in storage arrays based on temporal workload characteristics component 108 of FIG. 1).

These aspects of FIG. 8 can be similar to aspects of FIG. 7, where FIG. 8 depicts a scenario at time T+1 and FIG. 7 depicts the scenario at an earlier time T.

That is, FIG. 8 depicts memory READ and WRITE segment size changes and secondary memory segment sizes at time window T+1. Secondary memory regions segment sizes are increased (relative to FIG. 1) based on higher read and write misses feedback from the primary memory.

A memory recommendation for WRITEs can be as follows:

$$N = [16KB, 64KB, 128KB \ldots M^{th} \text{ Size}]$$

A memory recommendation for READs can be as follows:

$$N = [32KB, 64KB, 128KB \ldots M^{th} \text{ Size}]$$

In an example, a fall thru rate control determination can be implemented as follows. Whenever read misses occur at a higher rate, that can mean that the reads are not staying in the DRAM and secondary memory for a longer time period, causing a lower fall thru rate. If reads are staying in the DRAM for a longer period of time, then the fall thru rate can be high and more read hits can occur in the future.

A similar effect can occur based on a fall thru rate of read misses and write misses.

A secondary memory size can be set to equal Weight1. If fall thru rates of read segment sizes are becoming lower, then increase the secondary memory size by N %+Weight2. If fall thru rates of write segment sizes are becoming lower, then increase the secondary memory size by N %.

Read segments and segments can be weighted differently as read misses can have a higher weightage compared to write misses. E.g.:

Weight1=Read segment weights; by default, 0.7 value for this hyper parameter;

Weight2=Write segment weights; by default, 0.3 value for this hyper parameter.

Figure 9:
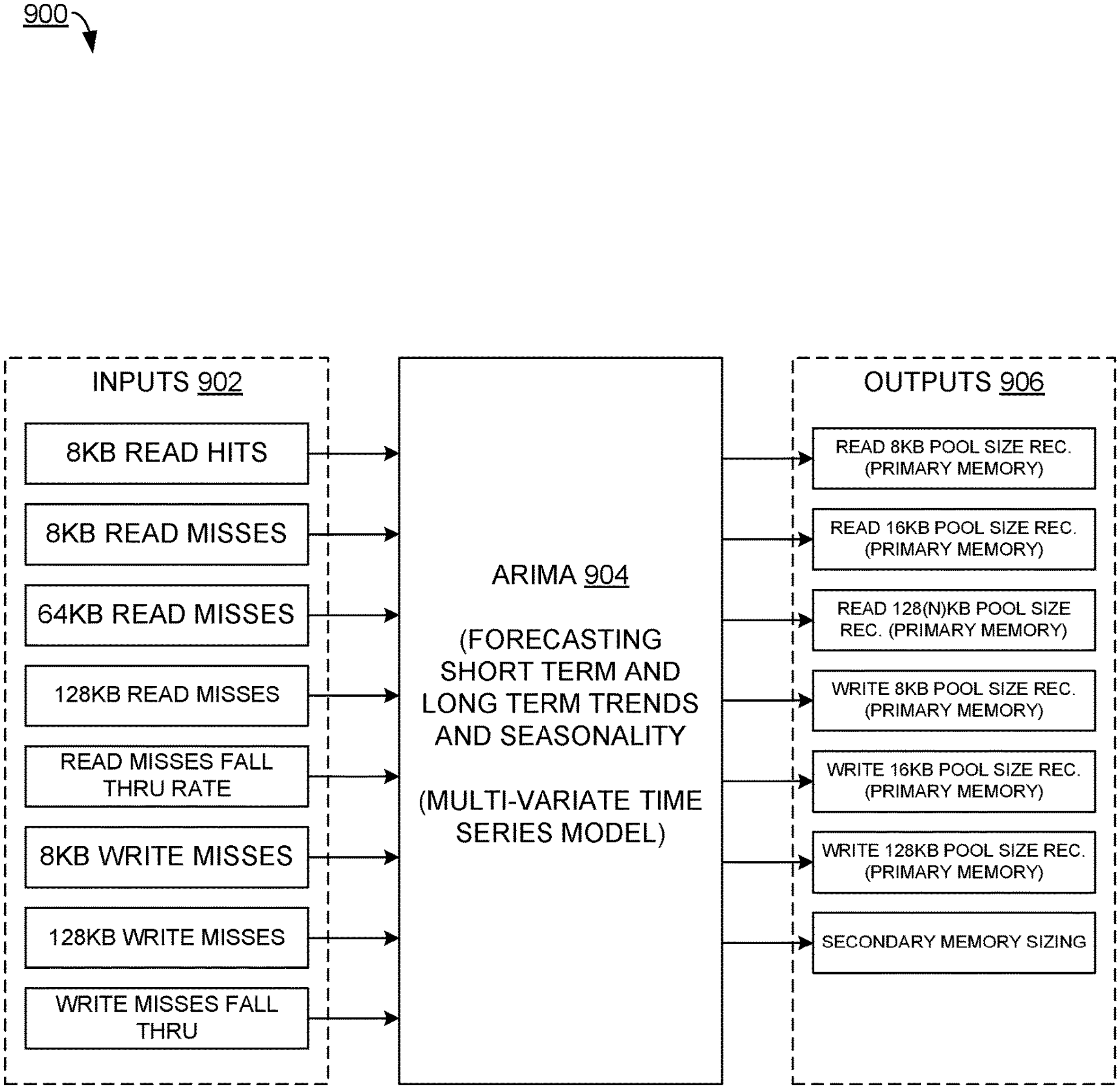
FIG. 9 illustrates an example autoregressive integrated moving average that can facilitate dynamic and persistent memory resizing in storage arrays based on temporal workload characteristics, in accordance with an embodiment of this disclosure.

FIG. 9 illustrates an example autoregressive integrated moving average 900 that can facilitate dynamic and persistent memory resizing in storage arrays based on temporal workload characteristics, in accordance with an embodiment of this disclosure. In some examples, part(s) of FIG. 9 can be used to implement part(s) of system architecture 100 of FIG. 1 to facilitate persistent memory resizing in storage arrays based on temporal workload characteristics.

FIG. 9 comprises inputs 902, ARIMA 904, and outputs 906. Inputs 902 can comprise a time series of information such as read hits 8 KB, read misses 8 KB, read hits 64 KB, read misses 64 KB, read hits 128 KB, read misses 128 KB, read hits nKB, read misses nKB, write hits 8 KB, write misses 8 KB, write hits 64 KB, write misses 64 KB, write hits 128 KB, write misses 128 KB, write hits nKB, write misses nKB, read fall thru rate, and write fall thru rate.

ARIMA 904 can take inputs 902 and produce outputs 906. Outputs 906 can comprise memory pool sizes such as, read 8 KB pool size recommendation (primary memory), read 16 KB pool size recommendation (primary memory), read 128 KB pool size recommendation (primary memory), read 128 nKB (that is, N different I/O sizes, which can also be referred to as n-KB) pool size recommendation (primary memory), write 8 KB pool size recommendation (primary memory), write 16 KB pool size recommendation (primary memory), write 128 KB pool size recommendation (primary memory), write nKB pool size recommendation (primary memory), and secondary memory size.

ARIMA 904 can comprise a multi-variate time series model that can forecast a sizing of READ and WRITE segments, and pools in primary and secondary memory across different time windows. This can comprise multi-step and multi-variate forecasting.

As applied to the example of FIG. 1, ARIMA 904 can be used to determine how to resize Tier 1 memory 112 and Tier 2 memory 120.

Example Process Flows

FIG. 10 illustrates an example process flow 1000 that can facilitate dynamic and persistent memory resizing in storage arrays based on temporal workload characteristics, in accordance with an embodiment of this disclosure. In some examples, one or more embodiments of process flow 1000 can be implemented by dynamic and persistent memory resizing in storage arrays based on temporal workload characteristics component 108 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 1100 of FIG. 11, and/or process flow 1200 of FIG. 12.

Process flow 1000 begins with 1002, and moves to operation 1004.

Operation 1004 depicts maintaining a memory pool that comprises a first tier of memory and a second tier of memory, wherein the first tier of memory is associated with a speed metric that is superior to the second tier of memory. Using the example of FIG. 1, the memory pool can be similar to memory pool 110, the first tier of memory can be similar to Tier 1 memory 112, and the second tier of memory can be similar to Tier 2 memory 120.

After operation 1004, process flow 1000 moves to operation 1006.

Operation 1006 depicts performing a group of operations at least one time, the group of operations comprising, for a current time of the at least one time: determining an autoregressive integrated moving average of first time series metrics of past accesses of the memory pool to produce second time series metrics of forecast future accesses of the memory pool, wherein the second time series metrics are provided as input to a reinforcement learning model, wherein a first output of the reinforcement learning model comprises first feedback to adjust a first size of a mirrored write segment portion of the first tier of memory and a second size of a non-mirrored read segment portion of the first tier of memory, wherein an overall size of the first tier of memory remains constant, wherein a second output of the reinforcement learning model comprises second feedback to adjust a weight of forecasting results associated with the second time series metrics of forecast future accesses of the memory pool in a subsequent time of the at least one time subsequent to the current time at which the group of operations is being performed, and determining to halt the performing of the group of operations at least one time where the first size and the second size satisfy a defined criterion.

Determining an autoregressive integrated moving average of first time series metrics of past accesses of the memory pool to produce second time series metrics of forecast future accesses of the memory pool can be performed in a similar manner as ARIMA and reinforcement learning model 310 of FIG. 3 taking as input (a) host I/Os forecasting of I/Os and sizes distribution 306, and (b) read and write memory segmentation and Tier 1 and Tier 2 resizing 308.

The first output of the reinforcement learning model can be similar to +Ve or −Ve feedback to change sizing of Tier 1 and Tier 2 memory regions, which is sent from 312 to read and write memory segmentation and tier 1 and tier 2 resizing 308. The second output of the reinforcement learning model can be similar to +Ve or −Ve feedback to ARIMA to weight the forecasting results differently, which is sent from 312 to host I/Os forecasting of I/Os and sizes distribution 306.

Determining to halt the performing of the group of operations at least one time where the first size and the second size satisfy a defined criterion can be performed where an affirmative answer is determined at achieved optimal (IOPS, RT, and FTT metrics) for Tier 1 and Tier 2 memory resizing for temporal workload? 312.

In some examples, a reward of the reinforcement learning model is determined based on a fall through rate of utilizing the memory pool. This can be similar to a fall thru rate technique as described herein.

In some examples, the fall through rate is determined based on a first weighting of the first fall through rate of read segments and a second weighting of the second fall through rate of write segments, and the first weighting is greater than the second weighting. In some examples, the fall through rate is determined based on a first fall through rate of read segments and a second fall through rate of write segments. That is, reads and writes can be weighted differently.

In some examples, the first feedback indicates moving at least part of data stored in the first tier of memory into the second tier of memory. That is, instead of evicting hot data, the hot data can be moved to a lower-performing memory region.

In some examples, the first time series metrics of past performance of the memory pool comprise an identification of data regions that satisfy an access-frequency criterion for each mirrored and un-mirrored memory region of each device of the memory pool, and respective read and write miss statistics for the respective data regions. That is, at each time period, it can be that hot data region locations (e.g., block addresses) can be read per device, per mirrored and unmirrored memory regions.

In some examples, the first time series metrics of past performance of the memory pool are determined based on first input-output operations performed for external workloads, and based on second input-output operations performed for internal workloads. The first input-output operations can be similar to host I/Os external workload 302, and the second input-output operations can be similar to internal workloads 304 (replication, migration, etc.).

After operation 1006, process flow 1000 moves to operation 1008.

Operation 1008 depicts, after the performing of the group of operations at least one time, adjusting a third size of the second tier of memory based on the first size and the second size, and storing computer data in the memory pool. That is, using the examples of FIGS. 7 and 8, a determination on how to adjust sizes of mirrored and non-mirrored memory of Tier 1 memory can be used to determine how to adjust a size of Tier 2 memory. A storage array can use the resized memory pool to facilitate data storage.

It can be that the sizes of Tier 1 memory and Tier 2 memory are correlated—that it is likely that a Tier 2 memory size is changed when Tier 1 memory is changed. In some examples, it can be that a Tier 2 memory size is not changed every time that Tier 1 memory is changed After operation 1008, process flow 1000 moves to 1010, where process flow 1000 ends.

FIG. 11 illustrates an example process flow 1100 that can facilitate dynamic and persistent memory resizing in storage arrays based on temporal workload characteristics, in accordance with an embodiment of this disclosure. In some examples, one or more embodiments of process flow 1100 can be implemented by dynamic and persistent memory resizing in storage arrays based on temporal workload characteristics component 108 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1000 of FIG. 10, and/or process flow 1200 of FIG. 12.

Process flow 1100 begins with 1102, and moves to operation 1104.

Operation 1104 depicts performing respective iterations of determining an autoregressive integrated moving average and producing an output of a reinforcement learning model, wherein the respective iterations comprise, determining the autoregressive integrated moving average of first time series metrics of past performance of a memory pool to produce second time series metrics of forecast future performance of the memory pool, wherein the memory pool comprises a first tier of memory and a second tier of memory, providing the second time series metrics as input to the reinforcement learning model, and producing the output of the reinforcement learning model that comprises first feedback to adjust respective sizes of a mirrored portion of the first tier of memory and a non-mirrored portion of the first tier of memory, and second feedback to adjust a weight of forecasting results associated with the second time series metrics of forecast future performance of the memory pool in a subsequent iteration. In some examples, operation 1104 can be implemented in a similar manner as operation 1006 of FIG. 10.

In some examples, the second time series metrics of forecast future performance of the memory pool comprises a first amount of random read hits of the memory pool, a second amount of random read misses of the memory pool, a third amount of read writes of the memory pool, a fourth amount of sequential reads of the memory pool, a fifth amount of sequential writes of the memory pool, or a sixth amount of random write hits of the memory pool. That is, different I/O sizes and types of a storage array can be considered, and these I/O sizes and types can be similar to those described with respect to FIG. 4.

In some examples, a first storage size of the first tier of memory is smaller than a second storage size of the second tier of memory.

In some examples, the first tier of memory comprises random access memory, and the second tier of memory comprises persistent memory.

In some examples, operation 1104 comprises performing repeated instances of the performing of the respective iterations according to a time schedule, wherein performing respective instances of the performing of the repeated instances comprises performing respective changes to sizing the memory pool. An example of this can comprise capturing user workload patterns across one- or two-hour time windows to reduce variation in the workload patterns.

In some examples, operation 1104 comprises determining the time schedule based on receiving time schedule data that is associated with a user account. That is, the time schedule can comprise a hyper-parameter that a user can select.

In some examples, the first time series metrics of past performance of the memory pool comprise a failure to tolerate metric, an input-output operations per second metric, or a response time metric. That is, the present techniques can be implemented to gradually learn to increase or decrease Tier 1 and Tier 2 memory regions, and observe an effect of these changes on metrics such as IOPS, RT, and FTT of cache slots used to hold user data.

After operation 1104, process flow 1100 moves to operation 1106.

Operation 1106 depicts halting the performing of the respective iterations where the respective sizes of the mirrored portion and the non-mirrored portion satisfy a defined criterion. In some examples, operation 1106 can be performed in a similar manner as operation 1006 of FIG. 10, as operation 1006 applies to determining to halt the performing of the group of operations at least one time where the first size and the second size satisfy a defined criterion.

After operation 1106, process flow 1100 moves to operation 1108.

Operation 1108 depicts, after the performing of the respective iterations, storing specified computer data in the memory pool. In some examples, operation 1108 can be implemented in a similar manner as operation 1008 of FIG. 10.

After operation 1108, process flow 1100 moves to 1110, where process flow 1100 ends.

FIG. 12 illustrates an example process flow 1200 that can facilitate dynamic and persistent memory resizing in storage arrays based on temporal workload characteristics, in accordance with an embodiment of this disclosure. In some examples, one or more embodiments of process flow 1200 can be implemented by dynamic and persistent memory resizing in storage arrays based on temporal workload characteristics component 108 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1000 of FIG. 10, and/or process flow 1100 of FIG. 11.

Process flow 1200 begins with 1202, and moves to operation 1204.

Operation 1204 depicts performing iterations of determining an autoregressive integrated moving average and producing an output of a reinforcement learning model until an optimality criterion of the memory pool is satisfied, comprising, determining the autoregressive integrated moving average of first time series metrics of the memory pool to produce second time series metrics of the memory pool, inputting the second time series metrics to the reinforcement learning model, and producing the output of the reinforcement learning model that comprises first feedback to adjust respective sizes of a mirrored portion and a non-mirrored portion of a tier of the memory pool, and second feedback to adjust a weight of the second time series metrics in a subsequent iteration.

In some examples, the second time series metrics comprise a forecast of future read and write accesses of the memory pool. That is, the second time series metrics can be output by an ARIMA technique. Using the example of FIG. 9, this can comprise ARIMA 904 producing outputs 906.

In some examples, the tier is a first tier, the memory pool comprises a second tier of memory, and operation 1204 comprises adjusting a size of the second tier of memory based on adjusting the respective sizes of the mirrored portion and the non-mirrored portion.

In some examples, the first feedback indicates adjusting a sizing of the mirrored portion or the non-mirrored portion.

In some examples, the first feedback indicates converting a first part of the mirrored portion into a second part of the non-mirrored portion, or converting a third part of the non-mirrored portion into a fourth part of the mirrored portion. That is, adjusting a size of Tier 1 memory can comprise converting a portion of mirrored memory into non-mirrored memory, or vice versa.

In some examples, write data is stored in the mirrored portion, and read data is stored in the non-mirrored portion.

After operation 1204, process flow 1200 moves to operation 1206.

Operation 1206 depicts, after the performing of the iterations, storing the memory pool according to the adjusted respective sizes.

After operation 1206, process flow 1200 moves to 1208, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of storage array 102 and/or remote computer 106 of FIG. 1.

In some examples, computing environment 1300 can implement one or more embodiments of the process flows of FIGS. 8-11 to facilitate dynamic and persistent memory resizing in storage arrays based on temporal workload characteristics.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 (containing disk 1322) can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN

1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

maintaining a memory pool that comprises a first tier of memory and a second tier of memory, wherein the first tier of memory is associated with a speed metric that is superior to the second tier of memory;

performing a group of operations at least one time, the group of operations comprising, for a current time of the at least one time:

determining an autoregressive integrated moving average of first time series metrics of past accesses of the memory pool to produce second time series metrics of forecast future accesses of the memory pool, wherein the second time series metrics are provided as input to a reinforcement learning model, wherein a first output of the reinforcement learning model comprises first feedback to adjust a first size of a mirrored write segment portion of the first tier of memory and a second size of a non-mirrored read segment portion of the first tier of memory, wherein an overall size of the first tier of memory remains constant, wherein a second output of the reinforcement learning model comprises second feedback to adjust a weight of forecasting results associated with the second time series metrics of forecast future accesses of the memory pool in a subsequent time of the at least one time, wherein the subsequent time is subsequent to the current time at which the group of operations is being performed, and determining to halt the performing of the group of operations at least one time where the first size and the second size satisfy a defined criterion; and after the performing of the group of operations at least one time, adjusting a third size of the second tier of memory based on the first size and the second size, and storing computer data in the memory pool.

2. The system of claim 1, wherein a reward of the reinforcement learning model is determined based on a fall through rate of utilizing the memory pool.

3. The system of claim 2, wherein the fall through rate is determined based on a first fall through rate of read segments and a second fall through rate of write segments.

4. The system of claim 3, wherein the fall through rate is determined based on a first weighting of the first fall through rate of read segments and a second weighting of the second fall through rate of write segments, and wherein the first weighting is greater than the second weighting.

5. The system of claim 1, wherein the first feedback indicates moving at least part of data stored in the first tier of memory into the second tier of memory.

6. The system of claim 1, wherein the first time series metrics of past performance of the memory pool comprise an identification of data regions that satisfy an access-frequency criterion for each mirrored and un-mirrored memory region of each device of the memory pool, and respective read and write miss statistics for the respective data regions.

7. The system of claim 1, wherein the first time series metrics of past performance of the memory pool are determined based on first input-output operations performed for external workloads, and based on second input-output operations performed for internal workloads.

8. A method, comprising:

performing, by a system comprising at least one processor, respective iterations of determining an autoregressive integrated moving average and producing an output of a reinforcement learning model, wherein the respective iterations comprise, determining the autoregressive integrated moving average of first time series metrics of past performance of a memory pool to produce second time series metrics of forecast future performance of the memory pool, wherein the memory pool comprises a first tier of memory and a second tier of memory, providing the second time series metrics as input to the reinforcement learning model, and producing the output of the reinforcement learning model that comprises first feedback to adjust respective sizes of a mirrored portion of the first tier of memory and a non-mirrored portion of the first tier of memory, and second feedback to adjust a weight of forecasting results associated with the second time series metrics of forecast future performance of the memory pool in a subsequent iteration;

halting, by the system, the performing of the respective iterations where the respective sizes of the mirrored portion and the non-mirrored portion satisfy a defined criterion; and after the performing of the respective iterations, storing, by the system, specified computer data in the memory pool.

9. The method of claim 8, wherein the second time series metrics of forecast future performance of the memory pool comprises a first amount of random read hits of the memory pool, a second amount of random read misses of the memory pool, a third amount of read writes of the memory pool, a fourth amount of sequential reads of the memory pool, a fifth amount of sequential writes of the memory pool, or a sixth amount of random write hits of the memory pool.

10. The method of claim 8, wherein a first storage size of the first tier of memory is smaller than a second storage size of the second tier of memory.

11. The method of claim 8, wherein the first tier of memory comprises random access memory, and wherein the second tier of memory comprises persistent memory.

12. The method of claim 8, further comprising:

performing, by the system, repeated instances of the performing of the respective iterations according to a time schedule, wherein performing respective instances of the performing of the repeated instances comprises performing respective changes to sizing the memory pool.

13. The method of claim 12, further comprising:

determining, by the system, the time schedule based on receiving time schedule data that is associated with a user account.

14. The method of claim 8, wherein the first time series metrics of past performance of the memory pool comprise a failure to tolerate metric, an input-output operations per second metric, or a response time metric.

15. A non-transitory computer-readable medium comprising instructions that, in response to execution, cause a system comprising at least one processor to perform operations, comprising:

performing iterations of determining an autoregressive integrated moving average and producing an output of a reinforcement learning model until an optimality criterion of memory pool is satisfied, comprising, determining the autoregressive integrated moving average of first time series metrics of the memory pool to produce second time series metrics of the memory pool, inputting the second time series metrics to the reinforcement learning model, and producing the output of the reinforcement learning model that comprises first feedback to adjust respective sizes of a mirrored portion and a non-mirrored portion of a tier of the memory pool, and second feedback to adjust a weight of the second time series metrics in a subsequent iteration; and after the performing of the iterations, storing the memory pool according to the adjusted respective sizes.

16. The non-transitory computer-readable medium of claim 15, wherein the second time series metrics comprise a forecast of future read and write accesses of the memory pool.

17. The non-transitory computer-readable medium of claim 15, wherein the tier is a first tier, wherein the memory pool comprises a second tier of memory, and wherein the operations further comprise:

adjusting a size of the second tier of memory based on adjusting the respective sizes of the mirrored portion and the non-mirrored portion.

18. The non-transitory computer-readable medium of claim 17, wherein the first feedback indicates adjusting a sizing of the mirrored portion or the non-mirrored portion.

19. The non-transitory computer-readable medium of claim 17, wherein the first feedback indicates converting a first part of the mirrored portion into a second part of the non-mirrored portion, or converting a third part of the non-mirrored portion into a fourth part of the mirrored portion.

20. The non-transitory computer-readable medium of claim 17, wherein write data is stored in the mirrored portion, and wherein read data is stored in the non-mirrored portion.

* * * * *